United States Patent
Johnson

(10) Patent No.: US 8,419,863 B2
(45) Date of Patent: Apr. 16, 2013

(54) METHOD FOR REMOVING PAINTED MARKINGS

(76) Inventor: Jesse Duane Johnson, Brevard, NC (US)

( * ) Notice: Subject to any disclaimer, the term of this patent is extended or adjusted under 35 U.S.C. 154(b) by 0 days.

(21) Appl. No.: 13/199,329

(22) Filed: Aug. 26, 2011

(65) Prior Publication Data

US 2013/0048032 A1 Feb. 28, 2013

(51) Int. Cl.
*B08B 3/08* (2006.01)

(52) U.S. Cl.
USPC ............ 134/38; 134/21; 134/26; 134/28

(58) Field of Classification Search .............. None
See application file for complete search history.

(56) References Cited

U.S. PATENT DOCUMENTS

| | | | |
|---|---|---|---|
| 4,579,627 A * | 4/1986 | Brailsford | 134/38 |
| 4,812,255 A | 3/1989 | Suwala | |
| 4,900,364 A * | 2/1990 | Diedrich | 134/4 |
| 5,188,675 A | 2/1993 | Dormon-Brailsford | |
| 5,605,579 A | 2/1997 | Distaso | |
| 7,255,116 B2 * | 8/2007 | Crocker | 134/111 |
| 2001/0022323 A1 | 9/2001 | Aslakson | |

FOREIGN PATENT DOCUMENTS

WO    WO 02/02699 A1    1/2002

OTHER PUBLICATIONS

Graffiti Solutions, Inc.; Web site print out titled "Elephant Snot ® Graffiti Remover" from http://www.graffitisolutions.com/sites/default/files/ELEPHANT%20SNOT_Data%20Sheet.pdf; visited Aug. 26, 2011; 1 page from website; publisher is Graffiti Solutions, Inc.; city is Saint Paul Minnesota, USA; copy enclosed; cpyright 2010; copyright Graffiti Solutions, inc.; (1 page).
International Searching Authority; International Search Report and Written Opinion of the International Searching Authority; International Application No. PCT/US2012/05081; Patent Cooperation Treaty; pp. 1-13; publisher Korean Intellectual Property Office; Published Seo-gu, Daejeon Metropolitan, Republic of Korea; copyright and mailing date Jan. 31, 2012; copy enclosed (13 pages).

* cited by examiner

*Primary Examiner* — Michael Barr
*Assistant Examiner* — Caitlin N Dunlap
(74) *Attorney, Agent, or Firm* — Metz Lewis Brodman Must O'Keefe

(57) ABSTRACT

A method for removing painted markings is provided that includes the step of applying a paint removal agent to a painted marking on a surface. A covering may be applied to the paint removal agent. Further, a fluid may be applied to the covering as the covering covers the paint removal agent to effect removal of the painted marking, the paint removal agent, and the covering.

17 Claims, 7 Drawing Sheets

METHOD FOR REMOVING PAINTED MARKINGS

FIELD OF THE INVENTION

The present invention relates generally to a method for the removal of painted markings from surfaces. More particularly, the present application involves a method for the removal of painted road surface markings and other painted markings such as those found in parking lots and airport runways, and those undesirably placed as graffiti.

BACKGROUND

Painted markings are commonly applied to driving surfaces in order to mark lanes, stopping positions, crosswalks, railroad crossings, shoulders, and school zones. Asphalt and concrete surfaces in parking lots and driving areas of shopping malls, hotels, and office parks are also commonly provided with painted markings to guide drivers to desired locations and to demarcate parking positions. Airports also include surfaces that have painted markings for identification and outlining of runways and taxiways. It is often the case that painted markings are located outdoors and are exposed to harsh environmental conditions.

Since these markings may be a critical component of roadway surfaces, it is desirable to make them bright in color and strongly adhered to the roadway surfaces so they will be clearly seen and will not degrade and be removed. Highway paints may be acrylic-based and can contain ingredients such as methyl methacrylate which make them much brighter and durable than normal paints. Lane markings that are hard to see may cause drivers to swerve into adjacent lanes or to in fact drive in a lane designated for oncoming traffic. As such, roadway markings are generally made in a robust manner and are long lasting.

Often times it is desired to remove roadway markings when roads undergo construction or traffic patterns are changed. Further, painted markings are removed in other instances such as when parking spaces in a parking lot are changed. Since highway markings are made of paint that is stronger and more firmly adhered to roadway surfaces than paints applied to common household surfaces, the removal of highway markings is challenging. One cannot use paint removal techniques suitable for household paint removal on painted roadway markings as these two paint applications are not similar to one another but are more apples to oranges in comparison.

Highway marking removal may be accomplished by grinding the painted markings off of the roadway surface. This method is successful in removing the painted markings but also results in significant damage to the asphalt or concrete making up the roadway surface. Another method of removal is to use water blasting or abrasive blasting (for example sand blasting). These techniques also create damage to the roadway surface, and with grinding are expensive, slow, and result in unpleasant scars on the roadway. Also, in the case of water blasting a large amount of water is generated. If the highway paint is lead based, this large amount of water must be disposed of using proper channels and cannot simply be allowed to drain off of the roadway. Disposal of large amounts of toxic water also increases the cost of the removal. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Figure 1:
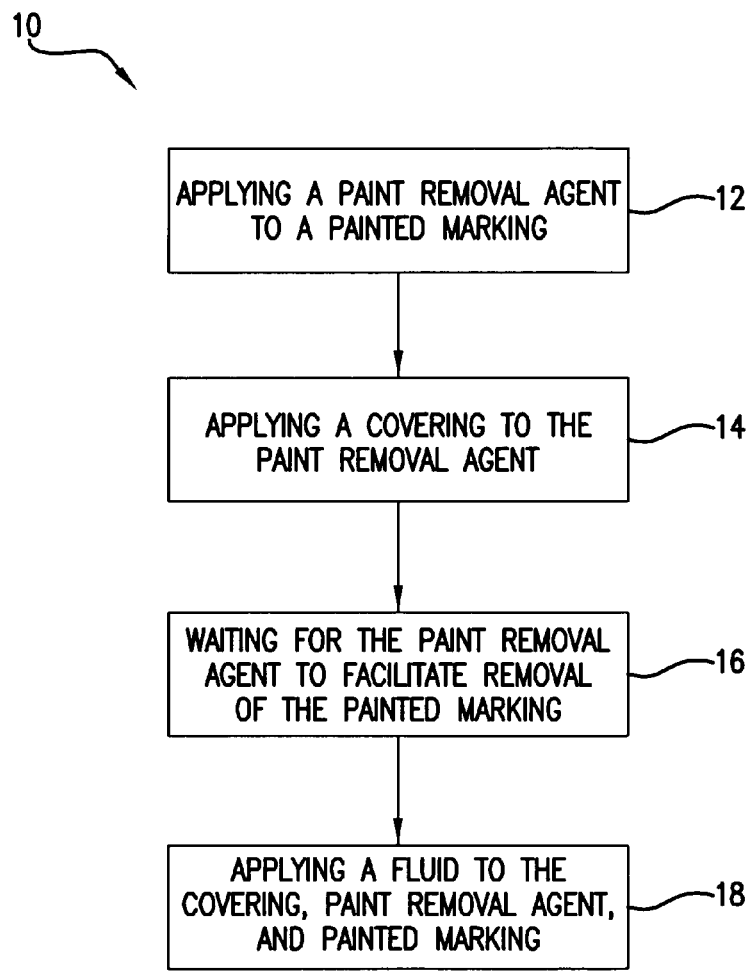
FIG. 1 is a flow chart of a method for removing painted markings in accordance with one exemplary embodiment.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a method for removing painted markings 10 such as those found in the form of lane dividers 32 on roads 30, or those found in the form of graffiti 50 on buildings, bridges, train cars, or sidewalks. The method 10 includes the application of a paint removal agent 22 to a painted marking 24 on a surface 20. The paint removal agent 22 functions to remove the painted marking 24 from the surface 20. A covering 26 is applied to the paint removal agent 22. The covering 26 may engage the paint removal agent 22 and may cover same in order to prevent evaporation of the paint removal agent 22 such as through evaporation of solvents of the paint removal agent 22, evaporation of certain components of the paint removal agent 22, or evaporation of the entire paint removal agent 22. Fluid 28 may be applied to the paint removal agent 22 while the covering 26 covers the paint removal agent 22. In this regard, the fluid 28 can be applied so as to first engage the covering 26 and then subsequently engage the paint removal agent 22. The covering 26 may be made of a dissolvable material so that the application of fluid 28 causes the covering 26 to break up. The fluid 28 may function to wash the covering 26, paint removal agent 22, and painted marking 24 from the surface 20 so that the painted marking 24 is desirably removed from the surface 20.

Figure 2A:
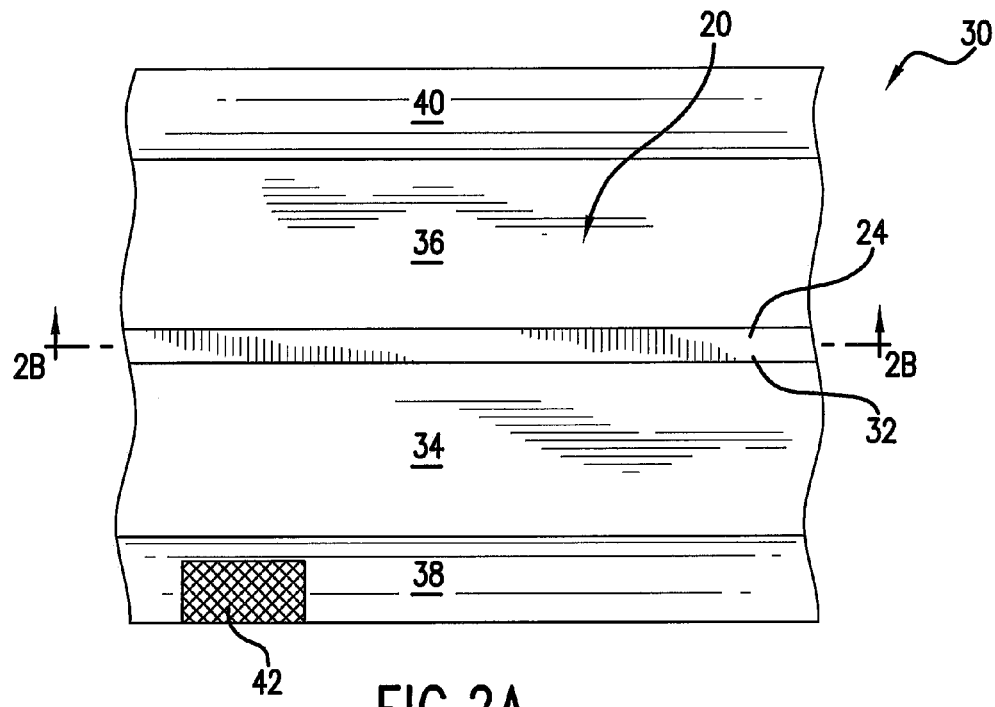
FIG. 2A is a top view of a road that has a painted marking that is a lane divider.
Figure 2B:
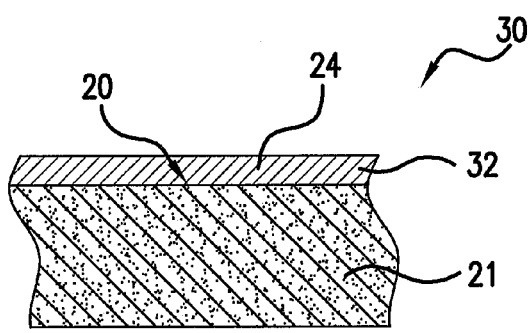
FIG. 2B is a cross-sectional view taken along line 2B-2B of FIG. 2A.

With reference first to FIGS. 2A and 2B, a road 30 is illustrated that is made from a base 21 that can be any type of material known in road design such as asphalt, concrete, or brick. A painted marking 24 is applied to the surface 20 of the base 21. The painted marking 24 may be made of paint that includes ingredients, such as methyl methacrylate, that function to make the painted marking 24 bright and durable. These types of characteristics may be desirable for markings on roads 30 to ensure they are visible in the rain, at night, and over time. However, such enhanced characteristics such as adhesion and durability may make the painted markings 24 harder to remove from the surface 20 when desired. The painted marking 24 can be applied to the surface 20 through a spray gun, paint roller, or any other suitable applicator. The painted marking 24 is adhered to the surface 20 and may form a layer that covers a portion of the surface 20.

The painted marking 24 may be made of SETFAST® acrylic waterborne traffic marking paint in accordance with one exemplary embodiment, provided by The Sherwin-Williams Company having offices located at 101 W. Prospect Avenue, Cleveland, Ohio, 44115, USA. This product may have 56% minimum volume solids, 73% minimum weight solids, 56% minimum pigment weight percentage, may be a 100% acrylic emulsion polymer latex, may be available in white or yellow colors, may be 2% by weight of methanol, may be 55% by weight of calcium carbonate, may be 5% by weight of titanium dioxide, may weight 13.70 pounds per gallon, may have a specific gravity of 1.65, and may not be soluble in water or may be soluble in water.

In accordance with yet another exemplary embodiment, the painted marking 24 may be PROMAR® 400 interior latex flat paint, provided by The Sherwin-Williams Company. This product may be a durable, interior vinyl acrylic paint that can be used on plaster, wallboard, wood, masonry, or metal. This product may have from 26%-30% volume solids, may have from 45%-49% weight solids, may weigh 11.3 pounds per gallon, may be 16% by weight of quartz, may be 3% by weight of cristobalite, may be 4% by weight of kaolin, may be 11% by weight of titanium dioxide, may have a specific gravity of 1.36, and may or may not be soluble in water.

The painted marking 24 may be made of a material that includes lead in some embodiments. In other embodiments, the painted marking 24 is made of a material that does not include lead. Further, titanium dioxide may be in the painted marking 24, or titanium dioxide may be absent from the painted marking 24 in some embodiments.

The painted marking 24 is applied in the form of a lane divider 32 that functions to separate a portion of the road 30 into an east bound lane 34 and a portion into a west bound lane 36. Motorists will use the lane divider 32 as a boundary line in which they will maintain their vehicles on one side thereof when using the road 30. Although shown in the form of a lane divider 32, it is to be understood that the painted marking 24 may be applied in the form of a shoulder boundary, stop line indicator, school zone indicator, railroad crossing warning, or any other indicator used in connection with roads 30. The road 30 also includes a pair of shoulders 38 and 40. Although a painted marking 24 used to designate the boundary between the shoulders 38, 40 and the lanes 34, 36 is not shown in the disclosed road 30, they may be so disclosed in other embodiments. Also, although shown as being a single solid, uninterrupted line, the lane divider 32 may be dashed lines or multiple parallel lines in other embodiments.

One embodiment of the method for removing painted markings 10 is illustrated in flow chart form in FIG. 1. The method 10 may include a step 12 of applying a paint removal agent 22 to the painted marking 24. The paint removal agent 22 may be applied through any suitable application process. For example, the paint removal agent 22 may be sprayed onto the painted marking 24, applied with a rag or towel, applied via a roller or brush, poured onto the painted marking 24 or applied by way of various contacting engagements. In accordance with one exemplary embodiment, a LINELAZER IV professional line stripper may be used to apply the paint removal agent 22. This product may be provided by Pavement Coatings, Inc., having offices located at 2120 N. Grand Avenue, Evansville, Ind., 47711, USA.

Figure 3A:
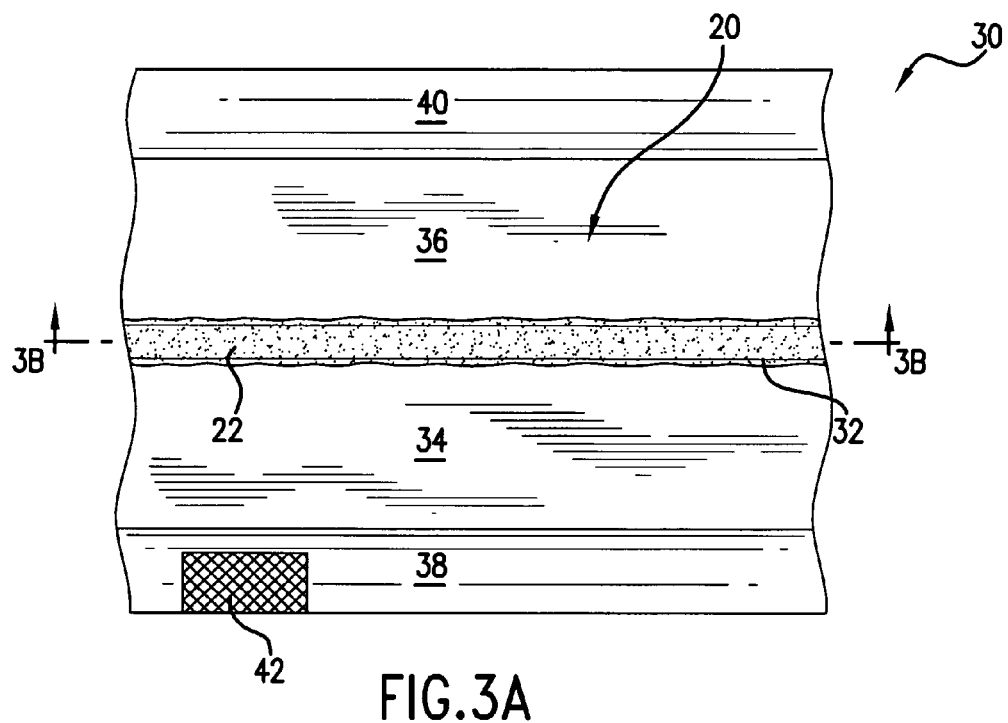
FIG. 3A is a top view of the road of FIG. 2A with a paint removal agent applied to the painted marking.
Figure 3B:
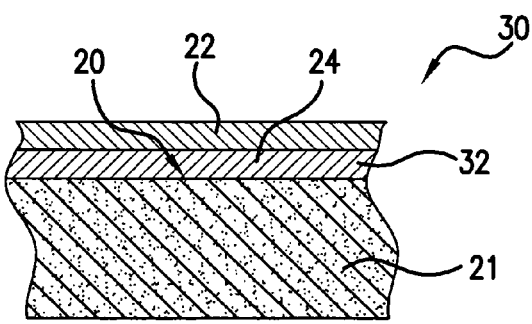
FIG. 3B is a cross-sectional view taken along line 3B-3B of FIG. 3A.

FIGS. 3A and 3B illustrate the paint removal agent 22 applied to the painted marking 24. The paint removal agent 22 may engage the painted marking 24. Further, the paint removal agent 22 may cover the painted marking 24 such that the paint removal agent 22 forms a layer on top of the painted marking 24 to cause the painted marking 24 to be vertically located between the surface 20 and the paint removal agent 22. The paint removal agent 22 may be applied to a portion of the surface 20 that is not covered by the painted marking 24. This may be due to the fact that excess paint removal agent 22 may be applied to the painted marking 24 such that some runs off the edges of the paint removal agent 22 and engages portions of the surface 20 adjacent the painted markings 24 not covered by the painted markings 24.

The paint removal agent 22 may be any material capable of causing the painted marking 24 to be removed from the surface 20. In this regard, the painted marking 24 need not be completely removed from the surface 20. The paint removal agent 22 may function to remove a portion of the painted marking 24 from the surface 20 while leaving some amount of painted marking 24 still on the surface 20. In other arrangements, the paint removal agent 22 may work to completely remove the painted marking 24 from surface 20.

The paint removal agent 22 may be an organic solvent mixture provided under the trade name SMART STRIP by Dumond Chemicals, Inc. having offices located at 104 Interchange Plaza, Suite 202, Monroe Township, N.J. 08331, USA. The SMART STRIP product may be made of, in weight percentages, from 1-5% titanium dioxide, from 1-5% non-hazardous ingredients, from 30-50% of proprietary ingredients, and from 40-60% water. The SMART STRIP product may have partial water solubility, a specific gravity of 1.14, and may be a white viscous liquid in appearance and consistency with a faint, aromatic odor.

In accordance with another exemplary embodiment, the paint removal agent 22 may be an organic solvent mixture provided under the trade name PEEL AWAY SMART STRIP PRO by Dumond Chemicals, Inc. The PEEL AWAY SMART STRIP PRO product may be made of, in weight percentages, from 1-5% titanium dioxide, from 1-5% non-hazardous ingredients, from 30-50% of proprietary ingredients, from 1-5% formic acid, and from 40-60% water. The PEEL AWAY SMART STRIP PRO product may have partial water solubility, a specific gravity of 1.20, and may be a white paste with a slight characteristic odor. The formic acid may sometimes be known as methanoic acid.

In accordance with yet another exemplary embodiment, the paint removal agent 22 may be a paint and varnish remover provided under the product name SAFEST STRIPPER™ Paint and Varnish Remover by 3M having offices located at 3M Center, St. Paul, Minn. 55144-1000, USA. The SAFEST STRIPPER™ Paint and Varnish Remover product may be made of, in weight percentages, from 65%-75% water, from 20%-30% dimethyl adipate, from 1%-5% dimethyl glutarate, and from 1%-5% smectite. The SAFEST STRIPPER™ Paint and Varnish Remover may be white in color with a slight ester odor and can be liquid in general physical form. The SAFEST STRIPPER™ Paint and Varnish Remover may have a specific gravity from 1.00-1.03, a pH of approximately 7, a viscosity from 60000.0-110000.0 centipoise, and may be soluble in water either partially or fully.

The dimethyl adipate that is used as a component of the paint removal agent 22 may be insoluble in water, may have a specific gravity from 1.055-1.065, may have a melting point of 8 degrees Celsius, and may be used as a solvent in the paint removal agent 22.

Still further, another exemplary embodiment exists in which the paint removal agent 22 is a latex based paint and graffiti remover that is water-based and biodegradable provided under the name Motsenbocker's Lift Off #5 by Motsenbocker's Lift Off, Inc. having offices with a mailing address of P.O. Box 90947, San Diego, Calif. 92169, USA. The Motsenbocker's Lift Off #5 product may be made of, in weight percentages, less than 5% acetone, and trade secret ingredients. The Motsenbocker's Lift Off #5 product may be a clear liquid in appearance with a mild odor, and be mixable with water, may have a pH from 11.9-12.1, a specific gravity of 1.0, and can have a vapor density so as to be heavier than air.

An additional exemplary embodiment of the paint removal agent 22 may be ELEPHANT SNOT® that is a graffiti 50 removal formula provided by Graffiti Solutions, Inc., having offices located at 2263 McKnight Road North, Suite 2, North Saint Paul, Minn., 55109, USA. This product may be a gel that can cling to vertical surfaces without dripping, may be biodegradable, may have a low rate of evaporation, may be used on surfaces with graffiti 50 that are "porous" and irregular in texture, made of a trade secret ingredient, may have a water solubility of 100% miscible, may have a specific gravity of 1.07.

In accordance with another arrangement, the paint removal agent 22 may be SUPERSTRIP® that is provided by Savogran Company having offices located at 259 Lenox Street, Norwood, Mass., 02062, USA. This product may include dichloromethane that may be included by weight of the product from 85%-90%, methanol that may be from 5%-10% by weight of the product, toluene that may be from 0%-5% by weight of the product, and paraffin wax that may be from 0%-5% by weight of the product. This product may have a boiling point of 104 degrees Fahrenheit, a specific gravity of 1.20, and appreciable solubility in water, and may contain 9% by weight of volatile organic compounds.

It is to be understood that the above-mentioned embodiments of the paint removal agent 22 are only exemplary and that others are possible. The ranges mentioned may be expanded or contracted, and the ingredients mentioned can be combined between the different products such that a different paint removal agent 22 used in the method 10 has ingredients from two or more of the above-mentioned embodiments. Further, it is to be understood that the ingredients mentioned above for the various paint removal agents 22 may not be all of the ingredients present in the various paint removal agents 22 and that others not listed can be included. The paint removal agent 22 may include various esters that are chemical compounds derived from the reaction of an oxoacid with a hydroxyl compound such as an alcohol or phenol. Further, paint removal agent 22 may include various ethanes. The paint removal agent 22 may be any substance, such as a paste, gel, liquid, solid, chemical compound, etc., capable of effecting removal of the painted marking 24 either completely or partially.

Figure 4A:
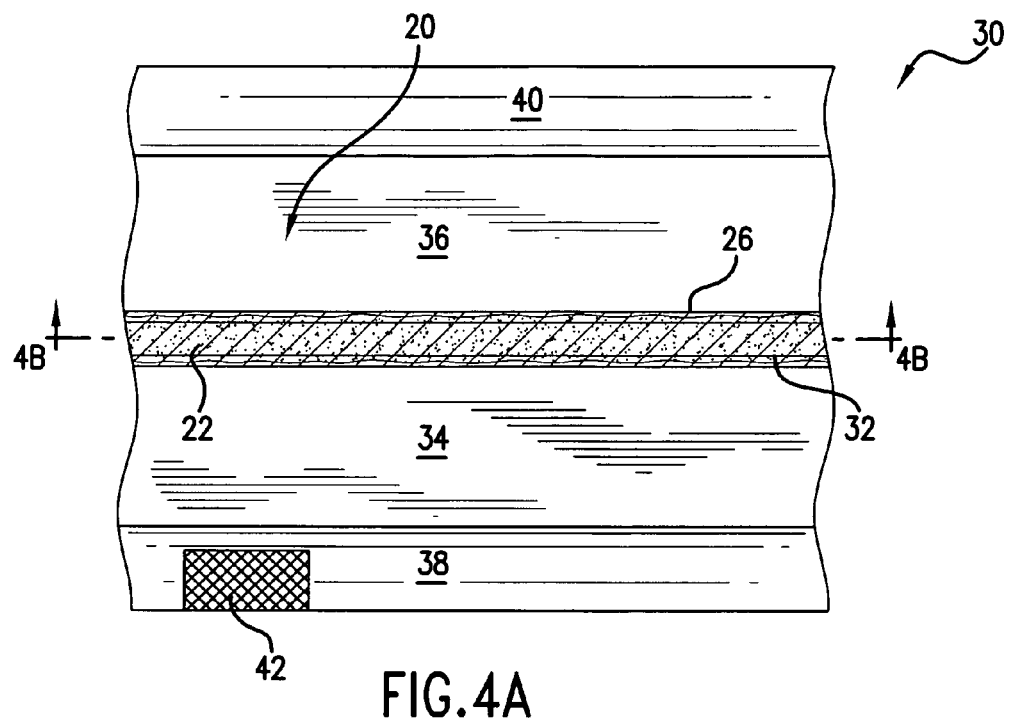
FIG. 4A is a top view of the road of FIG. 3A with a covering applied on top of the paint removal agent.
Figure 4B:
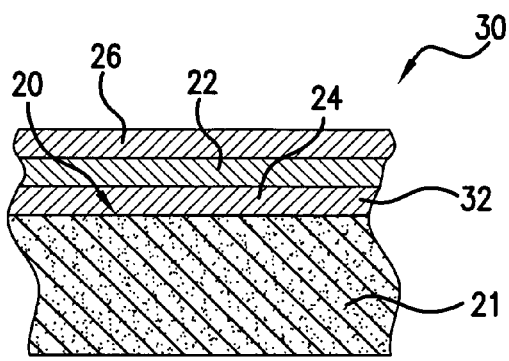
FIG. 4B is a cross-sectional view taken along line 4B-4B of FIG. 4A.

The method 10 may move from step 12 to step 14 in which a covering 26 is applied to the paint removal agent 22. The covering 26 can be applied in any manner such as being rolled on, placed on manually by hand, or having paint removal agent 22 previously applied to the covering 26. The covering 26 may engage the paint removal agent 22 such that the paint removal agent 22 is located between the covering 26 and the painted marking 24 as shown with reference to FIGS. 4A and 4B. The covering 26 may be provided in order to prevent all or some of the paint removal agent 22 from evaporating before it can effectively function to remove the painted marking 24. The paint removal agent 22 may contain alcohol that may evaporate when exposed to air, or other components that may evaporate when exposed to air. Although the paint removal agent 22 may work to remove the painted marking 24 when not covered, it may not work effectively when not covered. This is because the painted marking 24 is specifically designed to have increased adhesion and durability due to its external application and due to its need for these specific characteristics during its use. The covering 26 may function to keep the paint removal agent 22 engaged against the painted marking 24 during application and may function to reduce exposure of the paint removal agent 22 to the environment so that it will not degrade such that it will not lose effectiveness when working to remove the painted marking 24.

The covering 26 may be applied so that it covers the entire amount of the paint removal agent 22, or so that it covers a portion of the paint removal agent 22 while other portions are uncovered. As shown with reference to FIGS. 4A and 4B, the covering 26 covers the entire paint removal agent 22 on the road 30 such that a portion of the covering 26 extends beyond the paint removal agent 22 on either side of the paint removal agent 22 approaching the shoulders 38 and 40. The covering 26 may be applied so as to be larger than the footprint of the paint removal agent 22 to ensure that the paint removal agent 22 is properly covered. The covering 26 may be of a larger footprint than the footprint of the paint removal agent 22 so that air, wind, or debris are hindered from flowing under the covering 26 and against or onto the side areas of the paint removal agent 22.

The covering 26 may be adhered to the surface 20 through the use of tape, glue, or weighted objects. Additionally or alternatively, the covering 26 need not be adhered to the surface 20 but may simply lie on the surface 20 and/or the top of the paint removal agent 22 without being otherwise fixed thereon. The weight of the covering 26, and or natural tackiness of the paint removal agent 22 may function alone or in combination to properly secure the covering 26 in place.

In accordance with certain exemplary embodiments, the covering 26 may be dissolvable either partially or fully in water. In this regard, the application of water to the covering 26 may cause the covering 26 to lose its structural integrity such that it breaks up into smaller pieces. The covering 26 may be made of components such that when water is applied thereto, these components of the covering 26 dissolve in water and cause the remaining components to lose their ability to cover the full amount of the paint removal agent 22. As such, the covering 26 functions to cover the paint removal agent 22 when water is not applied so that the paint removal agent 22 is protected from evaporation and other environmental conditions, and functions to allow the paint removal agent 22 to be exposed to the environment and uncovered when the covering 26 is exposed to water.

The covering 26 may be made of any material capable of providing a barrier layer against air, either fully or partially, when not subjected to a threshold amount of water, and no longer providing a barrier layer against air once a threshold amount of water has been applied to the covering 26. The covering 26 may be a water-soluble film. The covering 26 may be made of plastic in accordance with certain exemplary embodiments. The covering 26 may be a fabric material. However, in other arrangements, the covering 26 is not made of a fabric material and is thus not a fabric.

In accordance with one exemplary embodiment, the covering 26 may be made of polyvinyl alcohol, which is a water soluble synthetic polymer. Polyvinyl alcohol has excellent film forming, emulsifying, and adhesive properties. This material may be resistant to oil, grease and solvent, and may be odorless and nontoxic. Polyvinyl alcohol may have high oxygen and aroma barrier properties, but these properties may be dependent upon humidity. The more water absorbed by the material may cause the tensile strength of the material to be reduced, but may increase elongation and tear strength. Polyvinyl alcohol may be fully degradable and may be a quick dissolver.

Polyvinyl alcohol used as covering 26 may have a density from 1.19-1.31 g/cm$^3$, a boiling point of 228 degrees Celsius, and a melting point of 230 degrees Celsius. Polyvinyl alcohol may be known as, or certain types of polyvinyl alcohol may be, PVOH, Poly(Ethenol), Ethenol, homopolymer, PVA, Polyviol, Vinol, Alvyl, Alkotex, Covol, Gelvatol, Lemol, Mowiol. The covering 26 may be made of a material that includes ingredients such as polyvinyl alcohol. For example, the covering 26 may be a polyvinyl nitrate or a polyvinyl acetal that include polyvinyl alcohol as a raw material. The polyvinyl alcohol may be arranged so that it is a water-soluble film. In accordance with other exemplary embodiments, the covering 26 may be other types of vinyl polymers.

Polyvinyl alcohol may be formed through a reaction of acetic acid with acetylene to form vinyl acetate. The vinyl acetate molecules may join with one another to form polyvinyl acetate. Methyl alcohol may be reacted with the polyvinyl acetate to cause alcohol groups to substitute with the acetate groups. In this manner, polyvinyl alcohol may be formed.

In accordance with one exemplary embodiment, the covering 26 may be MOWIFLEX TC® thermoplastic processable polyvinyl alcohol provided by Kuraray Holdings U.S.A., Inc., having offices located at 101 East 52$^{nd}$ Street, 26$^{th}$ Floor, New York, N.Y., 10022, USA. This product may be soluble in water, may form a clear and glossy film, and may have high tensile strength, may be easily printable thereon, may have a low electrostatic surface charge, may be colorable, may form a high barrier effect towards oxygen, nitrogen, carbon dioxide, and organic substances such as fragrances and aromas. This product may be incorporated into an additional product such as a plastic, may be biodegradable, and may be a thermoplastic compound.

The covering 26 may be placed onto any of the aforementioned paint removal agents 22 and will not be dissolved or degraded by any of the aforementioned paint removal agents 22 such that the covering 26 will still function to provide a barrier layer and reduce evaporation of the paint removal agent 22. In this regard, the covering 26 may be polyvinyl alcohol and may be capable of being placed upon and working with any of the aforementioned paint removal agents 22 without dissolving or tearing such that a barrier layer of the paint removal agent 22 will be formed.

The covering 26 may be a solid at room temperature. The covering 26 may include acetate groups that are replaced by alcohol groups, may dissolve in hot water, may dissolve in cold water, may dissolve in both hot and cold water, and may be insoluble in organic chemicals such as grease, fats, or oils. The covering 26 may be organic or inorganic in accordance with various exemplary embodiments.

In accordance with certain exemplary embodiments, a dye may be present in the paint removal agent 22 and/or covering 26 in order to allow users to associate the components of method 10 with the specific color. The dye may be BLAZON® BLUE 2×2.5 provided by Milliken Chemical having a mailing address of P.O. Box 1926, Spartanburg, S.C. 29303, USA. The dye may be a concentrated colorant and may be made of 100% proprietary colorant blend. The dye may be non-stain marking such that when the paint removal agent 22 and/or covering 26 engage the surface 20, the dye will not cause a stain to be made on the surface 20. It is to be understood that the dye is an optional component and need not be present in all embodiments of the method 10.

The method 10 may then move to step 16 in which the user will wait some amount of time for the paint removal agent 22 to work to remove the painted marking 24 from the surface 20. The amount of time needed to wait is dependent upon environmental conditions, the specific paint removal agent 22 used, and the specific painted marking 24 and surface 20 that are in play. It may be the case that at least one hour of time will have to be spent waiting in step 16 for the paint removal agent 22 to facilitate removal. If the temperature is cool or cold, it may be the case that at least 7 or 8 hours will have to be spent waiting in step 16 for the paint removal agent 22. Any amount of time may be spent waiting in step 16. For example, from 5 minutes to 2 days may be spent waiting in step 16 in accordance with various exemplary embodiments. Further, the step 16 may not be used in other embodiments when the paint removal agent 22 functions quickly to remove the painted marking 24.

Figure 5A:
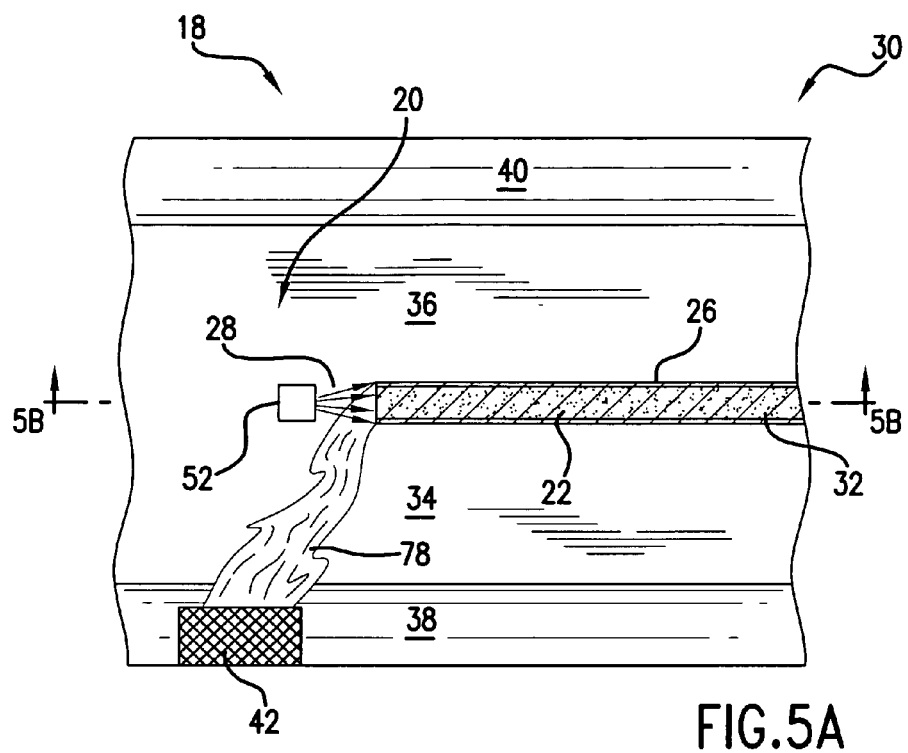
FIG. 5A is a top view of the road of FIG. 4A with fluid applied to wash off the combined covering, paint removal agent, and painted marking.
Figure 5B:
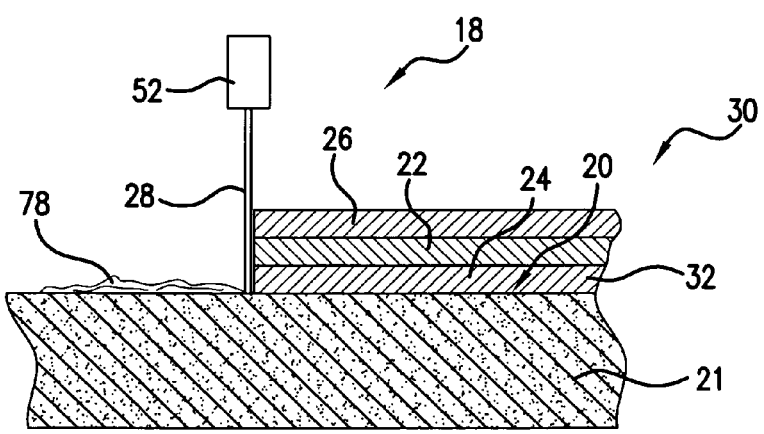
FIG. 5B is a cross-sectional view taken along line 5B-5B of FIG. 5A.

After some amount of time has been spent waiting in step 16, the method 10 may move to step 18 in which fluid 28 may be applied to the covering 26, the paint removal agent 22, and the painted marking 24 in order to facilitate removal of these components from the surface 20. Step 18 may be illustrated with reference to FIGS. 5A and 5B in which a pressure washer 52 is used to apply fluid 28. The fluid 28 may be water in certain exemplary embodiments. In accordance with other exemplary embodiments, the fluid 28 may be air, oil, solid particles, gel, paste, or variously configured. The pressure washer 52 may be capable of running at any pressure to deliver fluid 28. For example, the pressure washer 52 may operate at a pressure of 3500 psi or greater and may use fluid 28 that is water in accordance with certain exemplary embodiments. The pressure washer 52 can be carried and actuated manually by the user, or the pressure washer 52 may be incorporated into a vehicle or other apparatus. The use of a pressure washer 52 may not be needed in other embodiments of the method 10. For example, the fluid 28 may simply be dumped onto the covering 26, or may be applied without a pressure washer 52.

The fluid 28 may be water and may function to wet the covering 26 when applied. The covering 26 will absorb or otherwise engage the water 28 and be broken up as the covering 26 may be dissolvable in water. The water 28 will then function to engage the paint removal agent 22 and wash same away. Next, the water 28 will engage the painted marking 24 and remove the painted marking 24 from the surface 20. The painted marking 24 may have been weakened from adhesion with the surface 20 by the paint removal agent 22, and the pressure and/or water from the fluid 28 will function to wash or remove same from the surface 20.

As such, the step 18 may involve applying the fluid 28 such that the fluid 28 first engages the covering 26 before engaging either the paint removal agent 22, the painted marking 24, or the surface 20. The fluid 28 may be applied as the covering 26 engages the paint removal agent 22 such that the covering 26 is not manually removed prior to application of the fluid 28. The fluid 28 engages the covering 26 at the same time as when the covering 26 engages the paint removal agent 22 such that the covering 26 is at some point located between the fluid 28 and the paint removal agent 22. The fluid 28 is applied as the covering 26, paint removal agent 22, and painted marking 24 are all assembled with one another as a combined assembly. The fluid 28 is applied to this assembly while the paint removal agent 22 is covered and thus not exposed to the environment. The paint removal agent 22 engages both the painted marking 24 and the covering 26 simultaneously as the fluid 28 is applied for removal. The fluid 28 first engages the covering 26 and then breaks through this layer before subsequently engaging the paint removal agent 22 and then the painted marking 24.

The fluid 28 itself functions to remove the covering 26 and the other components. The covering 26, paint removal agent 22, painted marking 24, and fluid 28 will combine with one another after application of fluid 28 into washed off components 78. The washed off components 78 may flow via normal draining of the road 30 and off of surface 20. The washed off components 78 may flow into a drain 42 located in the shoulder 38. Additionally or alternatively, the washed off components 78 may flow off of the surface 20 in any variety of ways. The components 22, 24 and 26 may be environmentally friendly so that they can be washed off and eliminated in the same channels rain water drains from the road 30. However, if one or more of the components 22, 24 and 26 include materials that may damage the environment they can be appropriately removed. For example, if the painted marking 24 includes lead the washed off components 78 may be vacuumed up by a machine and the components 22, 24, 26 and 28 may be disposed of in the normal channels for materials of this type. As the amount of water 28 that is used for removal in method 10 is minimal, a lesser amount of waste must be vacuumed and disposed of thus leading to decreased costs of removal.

The fluid 28 may be applied such that the pressure washer 52 can be moved down the road 30 along the length of the lane divider 32 at an average rate of at least 4 seconds per foot (ie 3 inches per second). If a more powerful pressure washer 52 is used, the removal rate can be faster than 4 seconds per foot (ie 3 inches per second). The method 10 allows for the use of a pressure washer 52 that may be operated at a lower pressure than those needed for the removal of painted markings 24 when not using the method 10. As such, the method 10 may increase the life of equipment because less pressure is needed to effect removal of the painted markings 24. The painted markings 24 may extend for any length on surface 20. As such, the method 10 may be set up over any length of the surface 10 such that fluid 28 may be applied along a length from 1-10 miles, from 10-20 miles, up to 100 miles, or greater than 100 miles in certain embodiments.

Although described as using a pressure washer and fluid 28 that is water to remove the painted marking 24, covering 26, and paint removal agent 22, it is to be understood that these are not used in other embodiments. For example, abrasive blasting may be used instead of a pressure washer and the fluid 28 may be sand or other abrasive solids that are directed onto the covering 26, paint removal agent 22, and painted marking 24 to remove these components in accordance with certain exemplary embodiments.

Figure 6A:
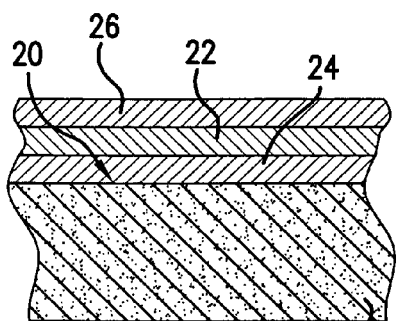
FIG. 6A is a cross-sectional view of a surface, painted marking, paint removal agent, and covering.
Figure 6B:
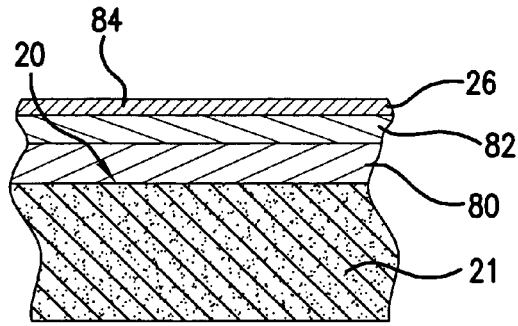
FIG. 6B is a cross-sectional view of FIG. 6A in which a portion of the covering is dissolved and in which the paint removal agent has combined with the painted marking.

FIGS. 6A and 6B illustrate another embodiment of some of the components used in the method 10. In FIG. 6A, the painted marking 24 is illustrated on top of the surface 20. A layer of paint removal agent 22 covers the painted marking 24, and a layer of covering 26 covers the paint removal agent 22. This arrangement may be the same as those previously discussed in which the covering 26 functions to reduce or eliminate evaporation of the paint removal agent 22 to increase its effectiveness. During the waiting step 16, the paint removal agent 22 may combine with the painted marking 24 to create a combined painted marking/paint removal agent 80. This may be the case because the paint removal agent 22 may mix and homogenize with the painted marking 24 as it is breaking up. In effect, some or all of the paint removal agent 22 may be mixed with the painted marking 24 into combination 80 as the paint removal agent 22 functions to dissolve the painted marking 24, break down the painted marking 24, or otherwise remove adhesion between the painted marking 24 and the surface 20.

Also as shown with reference to FIG. 6B, the paint removal agent 22 may include some amount of moisture. This moisture may function to dissolve a part of the covering 26 as the covering 26 may be dissolvable by water. A dissolved covering/paint removal agent 82 is shown in FIG. 6B on top of and engaging the combined painted marking/paint removal agent 80. The dissolved covering/paint removal agent 82 may include a portion of the covering 26 and the paint removal agent 22. In accordance with certain exemplary embodiments, the dissolved covering/paint removal agent 82 combines with the combined painted marking/paint removal agent 80 such that the painted marking 24, the paint removal agent 22, and a portion of the cover 26 are all homogenized into one combined substance that engages the surface 20.

Upon dissolving of a portion of the covering 26 due to water content in the paint removal agent 22, a remaining covering portion 84 of the covering 26 will still be present to function as a barrier as previously described. The partial melting of the covering 26 may function as an adhesive so as to cause the remaining covering portion 84 to adhere to dissolved covering/paint removal agent 82. The fluid 28 may be applied to the remaining covering portion 84 to dissolve same and then wash off the portion 84 along with the elements 80 and 82 from the surface 20 in basically the same manner as previously discussed. It is to be understood that discrete, identifiable layers of the various components may not be present in accordance with different embodiments. For example, layers 80 and 82 could be combined with one another into one layer covered by the remaining covering portion 84. The method 10 may involve the use of components that interact with one another in different manners before they are removed from the surface 20. Further, it is to be understood that the interactions in FIG. 6B are only exemplary and that others are possible.

Figure 7:
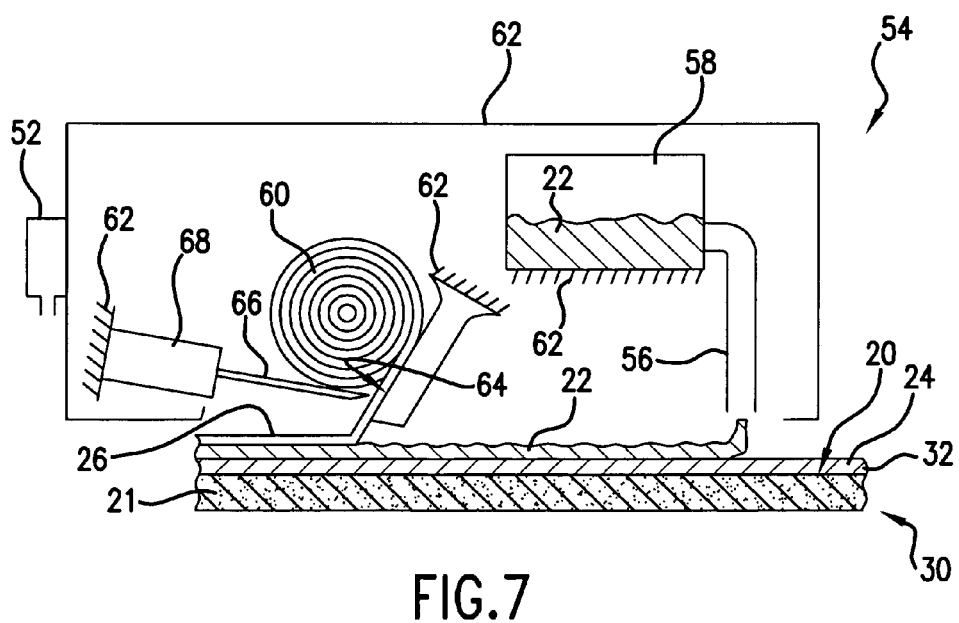
FIG. 7 is a schematic side view of an apparatus for applying paint removal agent and covering to a painted marking in accordance with one exemplary embodiment.

An apparatus 54 capable of effecting steps 12 and 14 of the method is disclosed with reference to FIG. 7. The apparatus 54 may include a frame 62 and can be attached to a vehicle or may be a stand alone device. The apparatus 54 can be fitted with wheels (not shown) to cause the apparatus 54 to move down the length of the road 30. The apparatus 54 may include a tank 58 rigidly carried by the frame 62 that houses the paint removal agent 22. The tank 58 may be fitted with a compressor to force the paint removal agent 22 therefrom. An applicator 56 may extend from the tank 58 to an area adjacent the surface 20. The paint removal agent 22 may be transferred from the tank 58 to applicator 56 that then applies the paint removal agent 22 to the painted marking 24. The applicator 56 may function to spray the paint removal agent 22 or to apply same through contact application to the painted marking 24. The viscosity or make-up of the paint removal agent 22 may dictate the type of applicator 56 used.

The applicator 56 is shown applying the paint removal agent 22 to the painted marking 24. The apparatus 54 can be moved so that the paint removal agent 22 is applied along the length of the painted marking 24. The applicator 56 may apply the painted marking 24 a width sufficient to cover the width of the painted marking 24, or the apparatus 54 can be driven, moved back to the start of the painted marking 24 and moved in a similar manner to clear off the remaining width of the painted marking 24.

The apparatus 54 may also include a roll 60 of covering 26. The roll 60 may be wound and carried by frame 62 such that the roll 60 unwinds relative to frame 62. The covering 26 may be unwound and applied to the previously applied paint removal agent 22. The covering 26 may adhere to the paint removal agent 22 due to the natural tackiness of the paint removal agent 22 and/or because of the weight of the covering 26 once placed onto the paint removal agent 22. The apparatus 54 may thus function to simultaneously apply paint removal agent 22 and covering 26. The covering 26 application section is located rearward of the applicator 56 so that the covering 26 will be placed upon the applied paint removal agent 22 and the apparatus 54 thus moves to the right as shown in FIG. 7.

A pneumatic actuator 68 is mounted to the frame 62 and can be actuated to move a cutting blade 66 in a linear direction. The covering 26 is unwound from roll 60 over a cutting surface 64 that may apply tension to the covering 26 before it is placed onto the paint removal agent 22. A tension roll (not shown) may also be present for imparting tension. The pneumatic actuator 68 may actuate in order to cause the cutting blade 66 to move into engagement with the covering 26 to cut off the covering 26 and cause same to be disengaged from the roll 60. The severed portion of the covering 26 is thus pinched between the cutting surface 64 and the cutting blade 66. The covering 26 can be separated when the desired amount of covering 26 has been unwound so that the paint removal agent 22 is adequately covered. It is to be understood that various arrangements of the cutting blade 66 can be developed in other exemplary embodiments and that the manner shown is only one possibility. Further, a pressure washer 52 may be mounted to frame 62 to effect the fluid 28 step 18. However, this step will most likely be performed later after the waiting step 16 and not upon immediate application of the covering 26. The pressure washer 52 need not be incorporated into the apparatus 54 in other embodiments and can be on a separate apparatus or simply a stand alone device carried or pushed by the user along the road 30.

Figure 8:
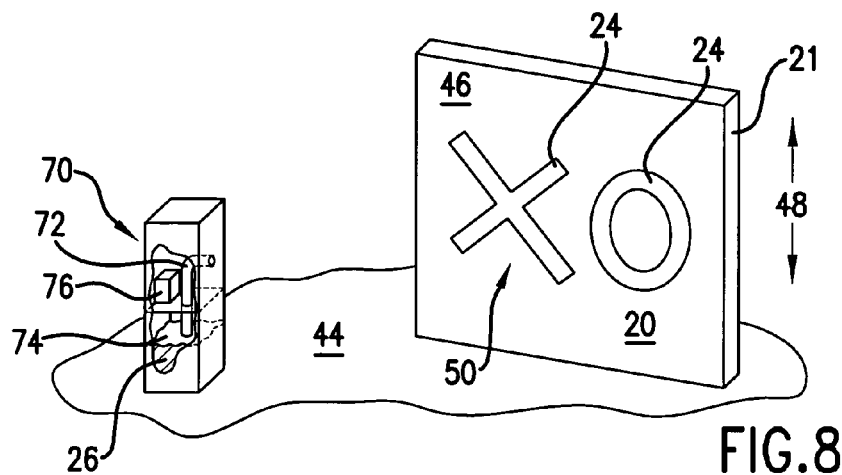
FIG. 8 is a perspective view of a vertical surface onto which graffiti is applied.

The method 10 can be used on various types of painted markings 24 whether found inside or outside. The painted markings 24 need not be associated with a road 30 but can be found on the surface 20 of any base 21 such as a bridge, building, sidewalk, parking lot, railroad car, vehicle, indoor soccer floor, indoor basketball floor, roller hockey ring, or rock formation. The surface 20 and base 21 may be made at least partially of petroleum and thus petroleum based in certain embodiments. Further, although shown in conjunction with a surface 20 that is horizontal in orientation, the surface 20 can be vertical or arranged in any type of orientation in other embodiments of the method 10. With reference now to FIG. 8, painted markings 24 are located on a vertically oriented surface 46 of a wall 21. The vertical direction 48 is shown and is arranged so that it is perpendicular to the surface of ground 44. As such, liquid located on surface 20 may flow downwards in the vertical direction 48 since the surface 20 is a vertical surface 46 and engage the ground 44. The markings 24 in FIG. 8 may be graffiti 50 that is placed onto the surface 20 of wall 21. The method 10 may be used by a city government, business owner, or homeowner in removing graffiti 50 from the wall 21.

The user may use the same steps as previously discussed such that the paint removal agent 22 is applied to the painted markings 24. The paint removal agent 22 may be of a consistency that allows it to remain on the vertical surface 46. In this regard, the paint removal agent 22 can be a viscous substance that is naturally tacky so that it can remain on the vertical surface 46 and function to remove the painted marking 24 from the vertical surface 46. The covering 26 application step 14 may be performed in manners previously discussed in various exemplary embodiments. However, with reference now to FIG. 9, step 14 is performed in a different manner from those previously discussed in that the covering 26 is sprayed onto the painted marking 24. The covering 26 may be initially provided as a shredded dissolvable covering 86. The shredded dissolvable covering 86 may be made of covering 26 material previously discussed that is in smaller, shredded pieces. For example, the shredded dissolvable covering 86 may be made of pieces of plastic that are torn up or formed into portions without a surface area larger than 1 square inch on both sides. In other embodiments, the pieces of shredded dissolvable covering 86 may have surface areas that are not larger than 0.5 square inches, not larger than 1.5 square inches, or not larger than 2.0 square inches on both sides. The small pieces of shredded dissolvable covering 86 can be applied in a variety of manners. The shredded dissolvable covering 86 may be provided so that it resembles or has a shape/consistency of confetti.

Figure 9:
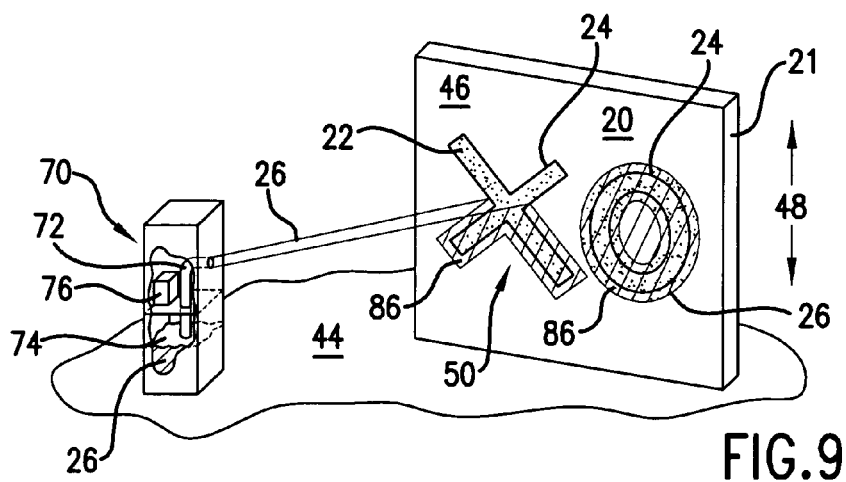
FIG. 9 is a perspective view of an apparatus for applying a covering that is shredded dissolvable plastic onto graffiti onto which paint removal agent is applied.

An apparatus 70 may be provided and used for the application of the shredded dissolvable covering 86 in step 14. The apparatus 70 may include a tank 74 into which the shredded dissolvable covering 86 is stored. A compressor 76 can be included in the apparatus 70 and may function to place the shredded dissolvable covering 86 in the tank 74 under pressure. A sprayer 72 may be included in the apparatus 70, and may be actuated in order to cause compressed shredded dissolvable covering 86 to be sprayed onto the paint removal agent 22. As shown in FIG. 9, the shredded dissolvable covering 86 is sprayed onto the "O" portion of the graffiti 50 and is partially applied to the "X" portion of graffiti 50 by the apparatus 70. The user may actuate apparatus 70 so that the shredded dissolvable covering 86 is adequately applied to all of the paint removal agent 22 as needed. In other embodiments, the user may apply the shredded dissolvable covering 86 in a variety of manners such as through hand application, or by way of a hand held contact applicator, or hand held sprayer.

Figure 10:
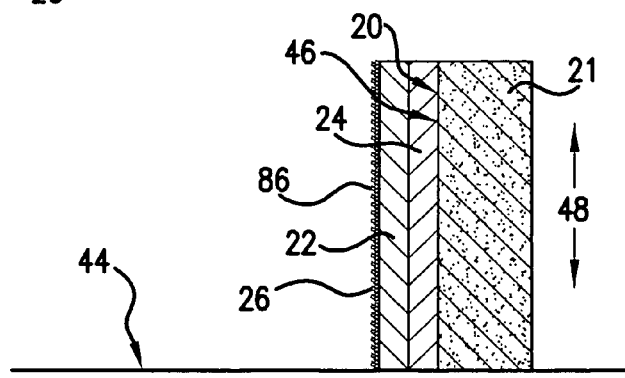
FIG. 10 is a side view of the shredded dissolvable plastic covering applied to the paint removal agent on the vertical surface.

With reference now to FIG. 10, the shredded dissolvable covering 86 is applied to the paint removal agent 22 to cause a barrier layer to be formed thereon. The pieces of the shredded dissolvable covering 86 may be naturally adhesive to one another due to the static attractiveness to one another. Further, the pieces of the shredded dissolvable covering 86 may engage the paint removal agent 22 and be retained thereon through tackiness and/or through partially dissolving onto the paint removal agent 22. The shredded dissolvable covering 86 can be sprayed onto the paint removal agent 22 until a suitable barrier layer is formed to prevent evaporation of the paint removal agent 22 as it works to remove the painted marking 24. Once an adequate amount of time has elapsed, the user may remove the shredded dissolvable covering 86, the paint removal agent 22, and the painted marking 24 from the vertical surface 46 through the use of a pressure washer 52 or other means for fluid 28 delivery as previously discussed. Also, although shown as being used in connection with a vertical surface 46 for the removal of graffiti 50, the shredded dissolvable covering 86 can be used in the method 10 when the painted markings 24 are not graffiti 50 and/or found on a vertical surface 46. For example, with reference back to FIGS. 4A and 4B, the covering 26 may be applied to the paint removal agent 22 covering the lane divider 32 on the road 30 by being formed through shredded dissolvable covering 86 applied by use of a sprayer or other applicator.

The method 10 has been described as having the sequential steps of applying a paint removal agent 22 to the painted marking 24 in step 12 and then, subsequently applying the covering 26 to the paint removal agent 22 in step 14. However, it is to be understood that other versions of the method exist in which step 14 is performed first in time in view of step 12. For example, the paint removal agent 22 may first be applied to the covering 26, and then subsequently the combined covering 26 and paint removal agent 22 may be applied to the painted marking 24 such that the paint removal agent 22 engages the painted marking 24. As such, the various steps 12, 14, 16 and 18 of the method 10 can take place simultaneously with one another or be ordered in various time positions. Also, steps additional to or less than those specifically disclosed in the method 10 in the discussed embodiments are possible in yet other exemplary embodiments of the method 10.

Although described as being used in outdoor applications, it is to be understood that the method 10 may be used either indoors to remove painted markings 24, outdoors, or combinations thereof. The method 10 may be used by a homeowner in removing painted markings 24 around the house. As such, the method 10 may be used in a wide variety of applications in various settings.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. A method for removing painted markings, comprising the steps of:
    applying a paint removal agent to a painted marking on a surface;
    applying a covering to the paint removal agent, wherein the covering is a dissolvable plastic covering that is carried as a roll, and wherein the applying a covering comprises unrolling the dissolvable plastic covering onto the paint removal agent; and
    applying a fluid to the dissolvable plastic covering such that the dissolvable plastic covering is dissolved by the fluid as the dissolvable plastic covering covers the paint removal agent.

2. The method as set forth in claim 1, wherein the painted marking is made from paint that includes methyl methacrylate as an ingredient, and wherein the surface is a surface of a road, and wherein the painted marking is a lane divider marking located on the road.

3. The method as set forth in claim 1, wherein the surface is a vertical surface, and wherein the painted marking is graffiti that is located on the vertical surface.

4. The method as set forth in claim 1, wherein the fluid is water, and wherein the applying a fluid step is performed using a pressure washer that applies the water to the covered paint removal agent at a pressure that is at least 3500 pounds per square inch.

5. The method as set forth in claim 1, wherein the surface is a surface of a road, and wherein the painted marking extends a distance of at least one quarter of a mile on the surface of the road, and wherein the applying a fluid step is performed at a speed of an average of at least 3 inches per second along the extent of the painted marking.

6. The method as set forth in claim 1, wherein the paint removal agent comprises water, dimethyl adipate, dimethyl glutarate, and smectite.

7. The method as set forth in claim 1, wherein the paint removal agent comprises titanium dioxide and water.

8. The method as set forth in claim 7, wherein the paint removal agent comprises formic acid.

9. The method as set forth in claim 1, wherein the paint removal agent comprises acetone.

10. The method as set forth in claim 1, wherein the dissolvable plastic covering comprises polyvinyl alcohol.

11. The method as set forth in claim 1, wherein the paint removal agent comprises a non-stain marking dye that functions as a colorant, and wherein the dissolvable plastic covering comprises a non-stain marking dye that functions as a colorant.

12. The method as set forth in claim 1, wherein the step of applying the paint removal agent is performed by an apparatus that has an applicator that functions to apply the paint removal agent to the painted marking on the surface;
    wherein the roll of dissolvable plastic covering is carried by the apparatus, wherein the apparatus has a cutting blade that functions to cut the dissolvable plastic covering from the roll once a sufficient amount of the dissolvable plastic covering is applied to the paint removal agent; and
    wherein the dissolvable plastic covering is dissolvable by water such that during the applying a fluid step water is applied to the dissolvable plastic covering to dissolve the dissolvable plastic covering and to wash the dissolvable plastic covering, the paint removal agent, and the painted marking from the surface.

13. A method for removing painted markings, comprising the steps of:
    applying a paint removal agent to a painted marking on a surface such that the paint removal agent engages the painted marking, wherein the paint removal agent functions to facilitate removal of the painted marking from the surface;
    applying a covering over the paint removal agent such that the paint removal agent is located between the painted marking and the covering, wherein the covering is a dissolvable plastic covering that is carried as a roll, and wherein the applying a covering comprises unrolling the dissolvable plastic covering onto the paint removal agent, wherein the dissolvable plastic covering is dissolvable by water, and wherein the dissolvable plastic covering functions to reduce evaporation of the paint removal agent as the paint removal agent functions to facilitate removal of the painted marking from the surface; and pressure washing the combined dissolvable plastic covering, paint removal agent, and painted marking with water such that the dissolvable plastic is dissolved by the water and the dissolvable plastic covering, the paint removal agent, and the painted marking are removed at the same time.

14. The method as set forth in claim 13, wherein the dissolvable plastic covering, the paint removal agent and the painted marking drain from the surface after the pressure washing step.

15. The method as set forth in claim 13, wherein the pressure washing step uses water at at least 3500 pounds per square inch, and further comprising the step of vacuuming the dissolvable plastic covering, the paint removal agent, the painted marking, and the water from the surface after the pressure washing step.

16. A method for removing painted markings, comprising the steps of:

applying a paint removal agent to a painted marking on a surface such that the paint removal agent engages the painted marking;

applying a covering that is dissolvable by water to the paint removal agent, wherein the covering is a dissolvable plastic covering that is carried as a roll, and wherein the applying a covering comprises unrolling the dissolvable plastic covering onto the paint removal agent, wherein the paint removal agent includes water that functions to partially dissolve a portion of the dissolvable plastic covering to assist in adhering the dissolvable plastic covering to the paint removal agent, wherein the dissolvable plastic covering functions to reduce evaporation of the paint removal agent while the paint removal agent engages the painted marking;

waiting after the applying the covering step to allow the paint removal agent time to facilitate removal of the painted marking from the surface; and pressure washing water onto the combined dissolvable plastic covering, paint removal agent, and painted marking after the waiting step such that the dissolvable plastic is dissolved by the water and the dissolvable plastic covering, the paint removal agent, and the painted marking are washed from the surface.

17. The method as set forth in claim 16, wherein the dissolvable plastic covering comprises polyvinyl alcohol, and wherein the covering and paint removal agent both comprise non-stain marking dye.

* * * * *